INVENTOR.
GUISEPPE PEREGO

May 13, 1969   G. PEREGO   3,443,823
COLLAPSIBLE FRAME FOR A BABY CARRIAGE
Filed July 31, 1967
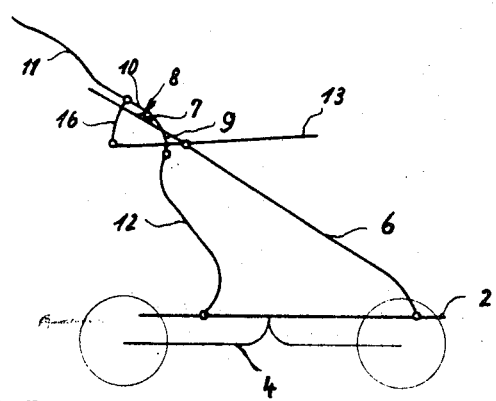
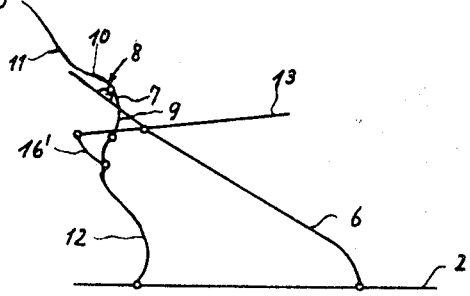
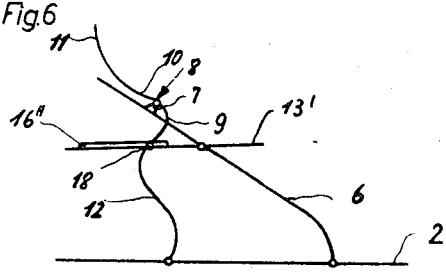
INVENTOR.
GUISEPPE PEREGO
BY
Woodhams, Blanchard & Flynn
ATTORNEYS

United States Patent Office 3,443,823
Patented May 13, 1969

3,443,823
COLLAPSIBLE FRAME FOR A BABY CARRIAGE
Guiseppe Perego, Piazza Martiri della Liberta 4–6,
Arcore, Milan, Italy
Filed July 31, 1967, Ser. No. 657,239
Claims priority, application Germany, May 23, 1967,
P 42,203
Int. Cl. B62b 7/10
U.S. Cl. 280—36                                    12 Claims

ABSTRACT OF THE DISCLOSURE

A collapsible frame for a baby carriage having at least two longitudinal support bars, which bars are interconnected by a pair of axles having wheels on the ends thereof. Each side of the support frame includes an inclined upwardly extending support member pivotally connected at one end to the support bar and pivotally connected at the other end to a rocker lever. The rocker lever is pivotally connected to an auxiliary support member at one end thereof, the other end of the auxiliary support member being pivotally connected to the other end of the support bar. One end of the rocker lever is formed as a pusher handle, which handle extends transversely across the frame so as to interconnect the rocker arms on both sides thereof for synchronized movement of the mechanisms on each side of the support frame. A locking device connects the rocker arm to the support member for holding the frame in the unfolded position. A pair of bed support arms are pivotally interconnected to the support members and the rocker arms.

---

This invention relates to a collapsible frame for a baby carriage comprising a base frame with at least two longitudinal bars, said base frame having wheels mounted thereto, two inclined upwardly extending supports, each of said supports being pivotally mounted to the respective longitudinal support in a position of use and being lockable by a lever system in said position, further comprising swingable bed support arms releasably connected with said supports and a pusher.

A known frame for a baby carriage of the described type comprises a lever system for locking the supports, said lever system comprising a bell crank for each support and diagonal trussing connecting both bell cranks. The connection between each support and the respective bed support arm consists also of a bell crank which is hingedly connected to a flap mounted on the support. Both bell cranks for the bed support arms are also connected by diagonal trussing. This described frame has an advantageous, simpler structure in comparison to older shapes having two support arms on each longitudinal side of the frame. However, handling during folding or unfolding is still complicated because four bell cranks must be moved, locked or released each time. The diagonal trussings between the bell cranks guarantees a synchronous movement of the bell cranks and of the supports during folding or setting up. However, said operation requires the use of two hands.

It is the purpose of this invention to construct a collapsible frame for a baby carriage of the above-described type which is built lightly and strongly by simple means so that it possesses the structural and weight advantages of only one support on each longitudinal side of the frame while also possessing a simplified and faster operating frame mechanism.

To attain said purpose, the invention provides that in the area of the free end of each support, a two-arm rocker lever is pin-jointed to the frame and is fixable in the position of use. The rocker lever also has one arm pin-jointed to one end of a support, the other end of said support being swingably supported on the longitudinal support associated therewith. The other arm of the rocker lever is constructed as an operating part for moving the support system into a position of use and into a folded position close to the base frame. Said support system comprises the support, the auxiliary support and the rocker lever, and has a bed support arm pivotally associated with said support, with each bed support arm being connected to the rocker lever by a mechanical connecting member in such a way that said bed support arm can be simultaneously moved with the support system into the position of use or into the folded position close to the base frame. The support system can be locked in the position of use.

Said advantageous embodiment of the frame for a baby carriage makes it possible by a simple movement of only one rocker lever to move the support, the auxiliary support and the bed support arm into the desired position. Furthermore, fixation of said one rocker lever is sufficient to lock the complete support of one longitudinal side of the frame together with the bed support arm associated therewith. Folding or setting up of the frame can thus be done by one or two manipulations and is easy and fast. The connection of the single structural parts by simple joints make the frame strong and maintenance free. Since only one locking device is required on each side, manufacture is simplified and inexpensive. The arm of each rocker lever constructed as an operating arm can advantageously be rigidly connected with the pusher. Thus, the pusher acts as a transverse connection between the support system of both longitudinal sides which thus makes possible a synchronous movement of both systems without requiring diagonal trussings. Thus, a free area is obtained between the base frame when the frame is folded, which area can be used to store other things when the frame is placed in storage or when taken along for example in a car. Furthermore, the pusher makes possible a simultaneous operation by hand of both rocker levers when said hand touches the transverse bar of the pusher. Moreover, a large lever arm is obtained for the swinging movement which greatly reduces the amount of force necessary for the swinging movement.

The pusher and the rocker lever can be advantageously constructed of one piece, which thus further simplifies the manufacture. The connecting member can advantageously be a bar hingedly affixed to the bed support part and also to the arm of the rocker lever constructed as an operating part. The bar thus affixed transmits the movement of the rocker lever directly to the bed support arm. Furthermore, only simple joint connections are required for its fastening. Said bar is thus an advantageous simple and strong connecting member. Moreover, said bar, when the frame is in the folded position, rests against the remaining parts of the support system in a space-saving manner.

The connecting member can advantageously also consist of a bar which is hingedly affixed to the bed support part and the auxiliary support. This embodiment also uses advantageously simple joint connections and has the advantage that the bar extends underneath the bed whereby the sides of the bed remain free.

The connecting member can advantageously consist of a guide on the bed support part and an element cooperating with said guide in the area of the joint between the rocker lever and the auxiliary support. The guide can advantageously consist of a slot in the bed support part and the element can consist of a pivot penetrating through said slot and being movable therein. This embodiment is easy to construct.

The free end of the support is advantageously constructed as a stop for the operating arm of the swinging lever. A suitable extension of said free end prevents the operating arm from being moved further when the position of use is reached, the bed support arm extending horizontally in said position of use.

The rocker lever, when in the position of use, is lockable with the free end of the support. This results in an easy and light structure since no further parts for limiting and locking the rocker lever movement are required.

Furthermore, the rocker lever can, at least in the area of the operating arm, advantageously consist of two rigidly connected, approximately parallel parts. Thus, it is made possible for the rocker lever to consist of a flat iron which allows the single parts of the support system to be closely arranged beside one another and to further consist of a tubular portion for connection to the pusher. Furthermore, it is possible to arrange said part of the operating arm leading to the pusher laterally so that it rests, when in the position of use, on the end of the support used as a stop.

Further details of the invention are disclosed in the description and the drawings.

One embodiment of a frame for a baby carriage is illustrated in the drawings, wherein:

FIGURE 4 is a schematic view of the support system of one longitudinal side of the frame of a baby carriage; and FIGURES 5 and 6 illustrate schematically other embodiments of the support system.

Figure 1:
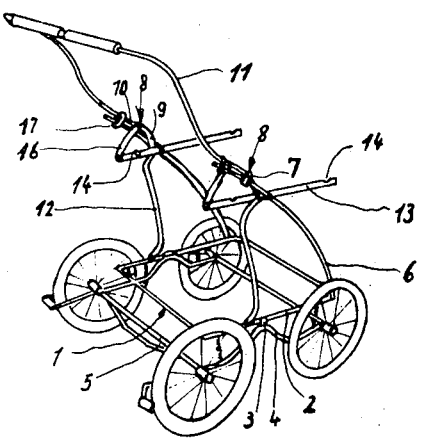
FIGURE 1 illustrates a frame of a baby carriage when in use.

The frame for a baby carriage illustrated in FIGURE 1 in the position of use comprises a base frame 1 with longitudinal bars 2. A support arm 4 is mounted to each longitudinal bar 2 by means of a holding device 3, said support arm having affixed thereto the wheel axles 5.

Each longitudinal bar 2 has pivoted thereto and variable in height a support 6. Said support 6 provides in the area of the pivoted end such an inclination that it extends upwardly when in position of use. Spaced away from the free end of the support 6 there is provided a holding device 7 which has pin-jointed thereto a two-armed rocker lever 8 spaced away from its two ends. The rocker lever 8 comprises an arm 9 which is downwardly directed when in position of use and an operating arm 10 made of curve-shaped flat iron and having a tubular member fixedly connected thereto at the moving joint of the holding device 7. Said tubular member is integrally connected to the pusher 11. An auxiliary support 12 is hingedly connected to the end of the arm 9 of the rocker lever 8, the other end of said support being movably connected to the longitudinal bar 2. The support 12 is of an S-shaped bent tubular member.

The support 6 has pin-jointed thereto a bed support arm 13 spaced from both of its ends and made of a flat bar. Said support arm 13 has recesses 14 and attachments to hold a bed or similar carriage body structure. When in position of use the support arm 13 extends horizontally. The end of the support arm 13 facing the pusher in position of use has hingedly connected thereto a bar 16, the other end of which is pivotally connected with the operating arm 10 of the rocker lever 8 at the end of the flat iron part of said operating arm. Said bar 16 is also flat and bent and forms the innermost part of the support system, while the support 6 and the pusher 11 form the outer parts. When in position of use the end of the pusher 11 connected to the operating arm 10 of the rocker lever 8 bears on the free end of support 6 and is lockable with said end by means of a ring 17 which slides loosely on said pusher 11. Said locking ring 17 holds the complete support system locked in position for use.

Figure 2:
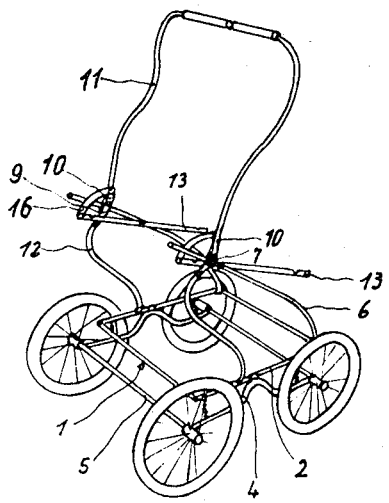
FIGURE 2 illustrates the frame of a baby carriage in an intermediate position.
Figure 3:
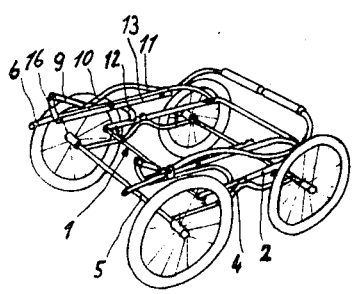
FIGURE 3 illustrates the frame of a baby carriage in collapsed position.

To fold said frame, lock ring 17 is moved upwardly beyond the end of support 6 and pusher 11 is then moved forwardly in the pushing direction. The rocker lever 8 thereby moves the support 12 backwardly and downwardly which causes the free end of the support 12 to also be lowered. The bar 16 at the same time transfers the movement of the rocker lever 8 onto the support arm 13, the free end of said arm thereby being slightly downwardly inclined. This intermediate position is illustrated in FIGURE 2. Upon further forward and downward movement of the pusher 11 the complete support system is lowered near the longitudinal bars 2. When in the folded position, as illustrated in FIGURE 3, the main portion of the support 6, the middle piece of support 12, the support arm 13 and a part of the pusher 11 extend approximatelly parallel to the longitudinal bars 2. The rocker lever 8 and the bar 16 also extend approximately horizontally.

The swinging operation which brings the frame back into position for use is accomplished in an exact opposite manner whereby again only the pusher 11 must be operated. At the end of the swinging movement, the rings 17 must be slipped over the end of the supports 6 whereby the frame is locked in position for use.

For purposes of clarification, FIGURE 4 schematically illustrates the support system together with the levers; supports and bars and the hinge connections therebetween indicated by circles.

FIGURE 5 illustrates a modified embodiment wherein the bar 16 is replaced by a bar 16' having one end pin-jointed to the support 13, the other end being pin-jointed to the support 12. The swinging operation is the same as above described.

FIGURE 6 shows a schematic illustration of a further embodiment in which the transfer of movement from the rocker lever 8 to the bed support arm 13 is done in a different manner. A longitudinal guide 16" is mounted to the bed support arm 13', said guide having for example the shape of a slot through which a pivot 18 penetrates, said pivot being movable in said longitudinal guide. Said pivot 18 is arranged on the joint between the arm 9 of the rocker lever 8 and the support 12. Upon movement of the pusher 11, the pivot 18 slides in the guide 16" in a direction toward the rear end of the bed support arm 13' and thus causes said bed support part 13' to be positioned close to the base frame when collapsed.

In the scope of the invention further embodiments for parts of the baby carriage frame are also possible. Thus, the rocker lever can be made of one piece whereby the advantage of striking against the end of the support can be provided by a shoulder. The pusher can be releasably connected to the operating arm of the rocker lever, for example, by telescoping the tubular sections into one another. Furthermore, all supports, bars and rocker levers can be made either of flat iron, of tubular members or of other profiles. The stop for the operating arm of the rocker lever can be effected in a different manner, for example, by projections standing off from the support. Devices can also be provided on the support and the operating arm, which devices effect holding of the support system in the position of use.

All characteristics disclosed in the description and the drawings can be important to the invention in other combinations.

The embodiments of the invention in which an exclusive property or privilege is claimed are defined as follows:

1. A collapsible frame for a baby carriage comprising a base frame having at least two longitudinal bars, said base frame having wheels mounted thereto, two support members each being pivotally affixed to a respective one of said longitudinal bars, said support members being inclined and extending upwardly when in a position of use, bed support arms connected swingably and lockably with the support members, a compound lever means for locking the support members in the upwardly inclined position of use, said lever means including a two-armed rocker lever pivotally connected to said support member and being lockable thereto when in the position of use, an auxiliary support member having one end thereof pivotally connected to one arm of the rocker lever and the other end thereof pivotally connected to one of the longitudinal bars, and a transverse pusher bar fixedly interconnected to the other arm of said rocker lever, movement of the pusher bar permitting the auxiliary support, the support member and the rocker lever to be moved from a position of use into a collapsed position adjacent the base frame, each bed support arm being pivotally connected to one of said support members and being further pivotally interconnected to said rocker lever by means of a connecting link whereby said bed support arms are moved from a position of use into a collapsed position adjacent the base frame when the pusher bar is moved so as to cause folding of the frame.

2. A frame for a baby carriage according to claim 1, wherein said other arm of the rocker lever is rigidly connected to the pusher.

3. A frame for a baby carriage according to claim 2, wherein the pusher is connected in one piece to the rocker lever.

4. A frame for a baby carriage according to claim 1, wherein the connecting link is a bar pivotally connected at opposite ends thereof to the bed support arm and the other arm of said rocker lever.

5. A frame for a baby carriage according to claim 1, wherein the connecting link is a bar pivotally flexibly connected at opposite ends thereof to the bed support arm and the support member.

6. A frame for a baby carriage according to claim 1, wherein the connecting link comprises a guide on the bed support arm and an element cooperating with said guide in the area of the joint between the rocker lever and the auxiliary support.

7. A frame for a baby carriage according to claim 6, characterized in that the guide is a slot in the bed support arm and the element is a pivot pin penetrating through said slot and being movable therein.

8. A frame for a baby carriage according to claim 1, wherein the free end of the support member is constructed as a stop for the operating arm of the rocker lever.

9. A frame for a baby carriage according to claim 1, wherein the rocker lever can be locked, when in the position of use, to the free end of the support member.

10. A frame for a baby carriage according to claim 1, wherein the rocker lever consists of two rigidly connected, approximately parallel arms.

11. A frame for a baby carriage according to claim 1, wherein the auxiliary support is bent in S-shape.

12. A frame for a baby carriage according to claim 1, wherein the support member is inclined in the area of the end hingedly connected to the longitudinal support bar.

References Cited
UNITED STATES PATENTS

| | | | |
|---|---|---|---|
| 2,287,315 | 6/1942 | Kroll | 280—36 |
| 2,292,132 | 8/1942 | Kroll | 280—36 |
| 3,145,999 | 8/1964 | Burnham | 280—36 |

LEO FRIAGLIA, *Primary Examiner.*

ROBERT R. SONG, *Assistant Examiner.*